(12) United States Patent
Nehse et al.

(10) Patent No.: US 11,720,272 B2
(45) Date of Patent: Aug. 8, 2023

(54) ACCESSING DATA USING UUIDS WITH A RAID SYSTEM

(71) Applicant: EMC IP Holding Company LLC, Hopkinton, MA (US)

(72) Inventors: Paul Nehse, Livermore, CA (US); Michael Thiels, San Martin, CA (US); Devendra Kulkarni, Santa Clara, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 181 days.

(21) Appl. No.: 17/321,164

(22) Filed: May 14, 2021

(65) Prior Publication Data

US 2022/0365694 A1 Nov. 17, 2022

(51) Int. Cl.
*G06F 3/00* (2006.01)
*G06F 3/06* (2006.01)

(52) U.S. Cl.
CPC .......... *G06F 3/0644* (2013.01); *G06F 3/0604* (2013.01); *G06F 3/0611* (2013.01); *G06F 3/0619* (2013.01); *G06F 3/0656* (2013.01); *G06F 3/0659* (2013.01); *G06F 3/0665* (2013.01); *G06F 3/0689* (2013.01)

(58) Field of Classification Search
CPC .... G06F 3/0659; G06F 3/0611; G06F 3/0656; G06F 3/0689
See application file for complete search history.

(56) References Cited

U.S. PATENT DOCUMENTS 8,843,459 B1 * 9/2014 Aston ..................... G06F 16/10
709/224

\* cited by examiner

*Primary Examiner* — Reginald G Bragdon
*Assistant Examiner* — Michael L Westbrook
(74) *Attorney, Agent, or Firm* — Womble Bond Dickinson (US) LLP

(57) ABSTRACT

A first node of a plurality of nodes is determined based on a node UID that is included in a physical extent (PE) universally unique identifier (UUID). Each of the plurality of nodes includes one or more groups of arrays. A local disk manager (LDM) that is associated with the first node is identified based on an LDM UID that is included in the PE UUID. The LDM manages a physical disk that includes a plurality of physical extents. A disk object is obtained based on a disk UID that is included in the PE UUID. The disk object is used to access a physical extent (PE) of the physical disk, using a PE offset that is included in the PE UUID. Other embodiments are described and claimed.

20 Claims, 6 Drawing Sheets

ACCESSING DATA USING UUIDS WITH A RAID SYSTEM

TECHNICAL FIELD

Embodiments of the present disclosure generally relate to a RAID system. In particular, embodiments of the disclosure relate to accessing data on a disk with a RAID system.

BACKGROUND

Data is an important asset for businesses. Data can be stored on servers which can be cloud-based and/or reside in a local network. Storage of data can be implemented with a RAID architecture, which stands for Redundant Array of Inexpensive Disks. Different RAID storage strategies, also referred to herein as RAID levels, can be implemented to distribute, organize, and manage data across multiple disks in an array of a RAID storage system.

For example, RAID 0 is a straightforward strategy that uses block-striping to spread data across an array of disks, but does not store the data with data redundancy. RAID 1 mirrors data across disks, but does so without parity. RAID 2 uses bit-level striping with parity. RAID 3 uses byte-level striping with parity. Other RAID levels can be implemented to vary the speed and/or reliability of the storage of data.

Some storage systems can use a scale up model which requires very large and complex disk farms to meet customer capacity and performance requirements. Such systems may lack flexibility when it comes to expanding, or shifting storage arrays.

BRIEF DESCRIPTION OF THE DRAWINGS

Embodiments of the disclosure are illustrated byway of example and not limitation in the figures of the accompanying drawings in which like references indicate similar elements.

DETAILED DESCRIPTION

Figure 1:
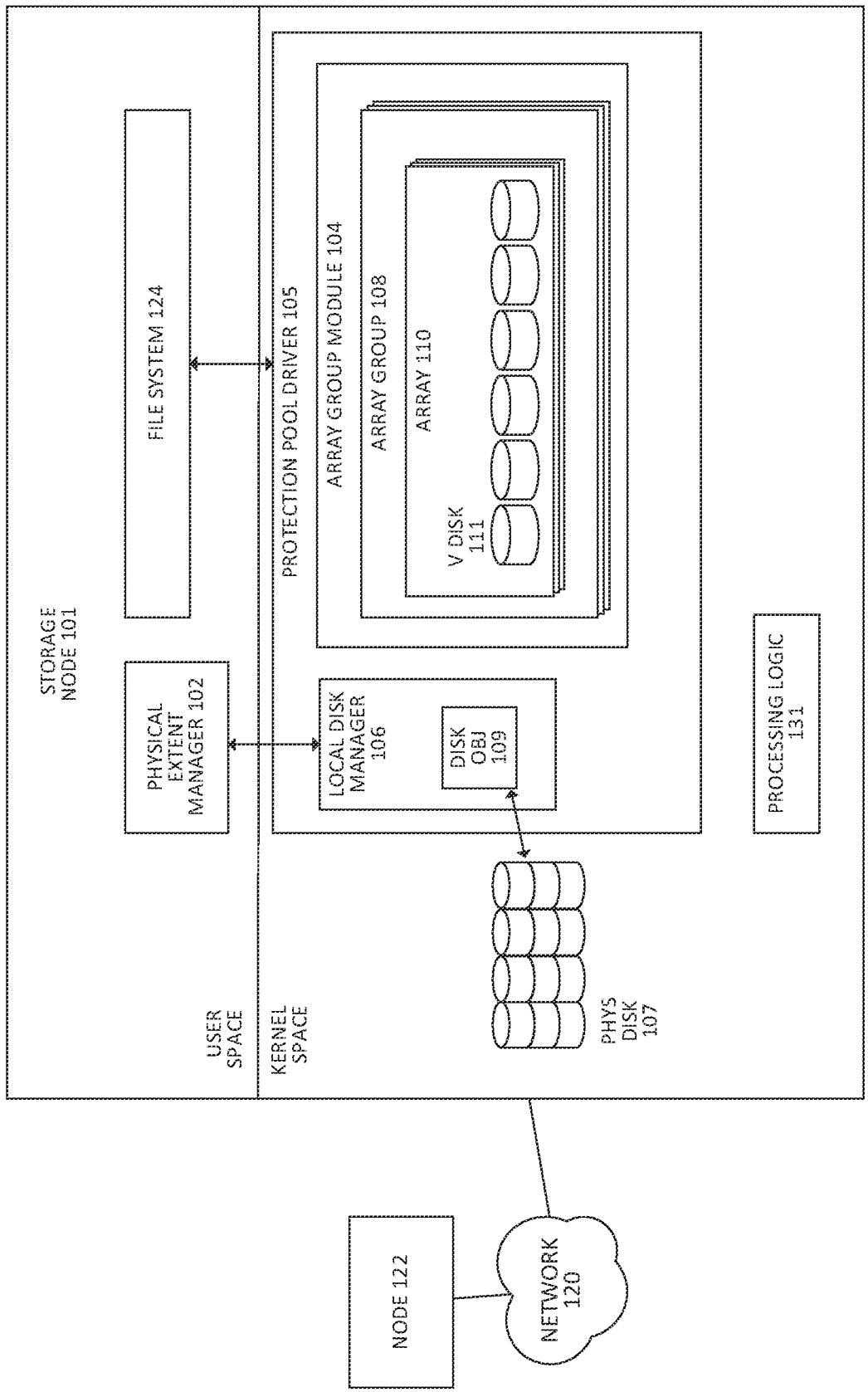
FIG. 1 shows a system for data storage, according to some embodiments.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "some embodiments," "one embodiment" or "an embodiment" means that a particular feature, structure, or characteristic described in conjunction with the embodiment can be included in at least one embodiment of the disclosure. The appearances of the phrase "embodiment" in various places in the specification do not necessarily all refer to the same embodiment.

With a RAID architecture, data storage can be virtualized, to combine multiple physical disk drive components into one or more logical units. Storage virtualization can include grouping the physical disk drive components into one or more logical units, and managing access of these logical units, making them available to other systems. Storage media such as, for example, hard disk, optical disk, etc., can be treated as a single pool of storage. As mentioned, however, storage systems generally use a scale up model which requires very large and complex disk farms to meet customer capacity and performance requirements. Such systems may lack flexibility when it comes to expanding, or shifting storage arrays.

Improved flexibility can be had with a shared protection pool architecture. A cluster, which includes a collection of nodes, can share a common protection pool. The shared protection pool allows any node in the cluster to access any part of the storage. This allows a file system, which can be referred to also as a collection partition, to dynamically grow and shrink. For example, a cluster can include a plurality of nodes, and each of those nodes can include storage (e.g., physical disks) that any of the other nodes can access.

When a node fails, a collection partition (e.g., a file system) can be migrated to another node and continue to access the storage. The protection pool also provides a protected storage that is resilient against at least dual disk and/or single node failures.

In some embodiments, a storage system can access data (e.g., a read or write) in a physical disk using a physical extent (PE) universally unique identifier (UUID). In user space, a file system can generate an I/O request. In response to the I/O request, a processor can determine a first node of a plurality of nodes based on a node unique identifier (UID) that is included in a PE UUID. Each of the plurality of nodes can comprise one or more groups of arrays. The processor can identify a local disk manager (LDM) that is associated with the first node based on an LDM UID that is included in the PE UUID. The LDM can manage one or more physical disks. Each physical disk can include a plurality of physical extents. The processor can obtain a disk object based on a disk UID that is included in the PE UUID. The processor can access, with the disk object, a physical extent of the one or more physical disks using a PE offset that is included in the PE UUID. The access of the disk can be a read or a write. Other embodiments are described.

FIG. 1 shows a system for data storage, according to some embodiments. A data storage system can include some components that run at user level and other components that run at kernel level of each of the storage nodes in a cluster. A storage node 101 can include a physical extent manager (PEM) 102 running in the user space. A protection pool driver 105 having an array group module (AGM) 104 and a local disk manager (LDM) 106 can run in the kernel space.

By implementing the LDM and the AGM in the kernel space of a computing device, a node can invoke or reuse a significant portion of a RAID driver. Kernel space can include memory and resources that are reserved for running a privileged operating system kernel, kernel extensions, and some device drivers. User space can include memory area of a compute device where application software and some drivers execute.

One or more other storage nodes, such as node 122, which can have the same features shown of node 101, can be connected to a network 120. The nodes can communicate with each other to provide a redundant storage solution (e.g., a RAID storage system) to support one or more file systems. Network 120 can include a wired and/or wireless communication protocol such as TCP/IP, Ethernet, Wi-Fi, LTE, and other equivalent technologies. Each node on a cluster can include an LDM, and each LDM of each node can communicate with each of the PEMs of remaining nodes in the cluster.

The protection pool, which includes a pooling of one or more physical disks 107, can be managed by a PEM 102. On each node, a PEM can manage one or more array groups 108 that are managed by an array group module 104. On each node, when capacity is added, for example, if the file system grows or a new file system is created, the PEM can request allocation of physical extents from LDM 106.

Array ownership of a PE can be determined by the LDM that owns and manages the physical disk on which the PE resides on. For example, LDM 106 can own one or more physical disks 107, and each of those disks can include regions of storage that are divided into physical extents, which serve as a basic storage unit. If there is a race between two PEMs (from different nodes) to allocate the same PE to an array, the LDM 106 can determine which array is granted the PE from the one or more physical disks 107 (for example, based on node ID or other arbitrary selection). The array that is not granted the PE can fail the array creation, and the PEM on that node can regenerate a new PE list and try to create the array again.

Figure 4:
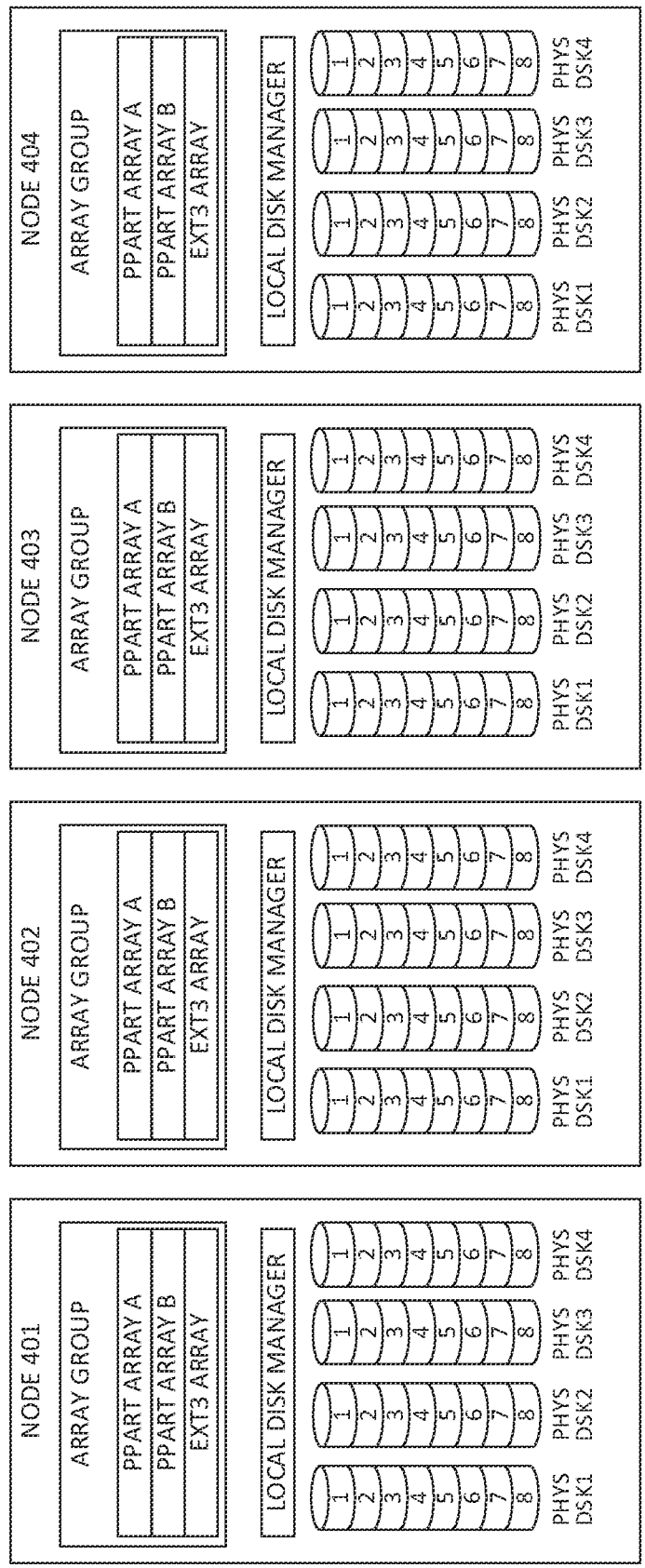
FIG. 4 shows an example system for data storage with a plurality of nodes, according to some embodiments.

In some systems, a RAID driver can manage arrays as part of a disk group which ties an array to physical disk. To increase flexibility, the protection pool driver 105 can separate each of the arrays in the array groups from physical disk groups. For example, array group module 104 can manage one or more array groups 108. Each of the array groups can include one or more arrays 110. Each array can use one or more virtual disks 111. Each of the virtual disks can contain a list of PEs, as shown in FIG. 4. Each of the PEs can map to physical disks such as the one or more physical disks 107, that are used across the cluster.

Disk I/O processing code can have a network component added so when an I/O request is issued it is redirected to the owning node/disk. The receiving node can process the I/O request using an existing 'make disk' request code. Once the I/O request is complete the results can be returned (e.g., 'complete', or 'fail') to the requesting node.

The LDM can divide each physical disk into physical extents and manage allocation and ownership of these extents, for example, the mapping between each virtual disk 111 and each physical extent across the cluster. The AGM can manage the arrays that makeup a collection partition. The AGM can manage the creation of arrays and provide a single UUID used to manage all the array for reassemble and migration to another node.

Figure 2:
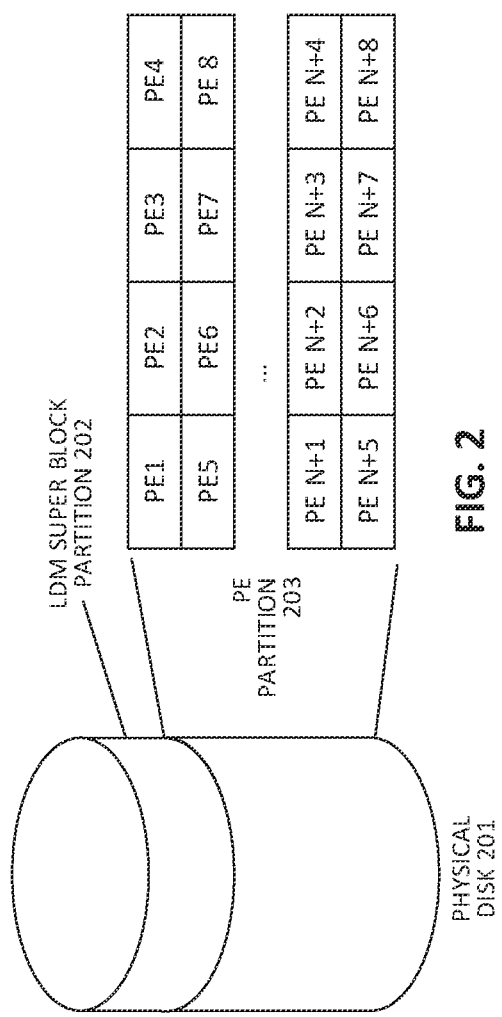
FIG. 2 shows an example of physical disk with physical extents, according to some embodiments.

FIG. 2 shows an example of a physical disk with physical extents, according to some embodiments. A physical extent (PE) is a basic unit of storage allocation in the protection pool. A physical disk 201 can be divided into a plurality of PEs, such as PE 1-PE N+8. A PE can be a span of contiguous logical block addresses (LBA) on a physical disk. All physical disks can be divided into equal size PEs. The size of all PEs can be the same across the cluster. The PEs can be contained within a dedicated partition 203 on the physical disk, so that the disk can be used for multiple uses if needed.

For example, the physical disk 201 can also include an LDM super block partition 202 which can store metadata of the local disk manager or other data. The metadata can include a PE UUID for each PE, as described in other sections. Some disks in the cluster can have the same capacity or different storage capacity. In some embodiments, all disks have the same capacity for management of PE allocation.

Referring to FIG. 1, the LDM 106 can manage one or more physical disks 107 on node 101. The responsibilities of the LDM can include initial creation of a PE map, PE allocation, proactive disk error monitoring, disk failure management, maintaining the current state of disks and PEs, and/or managing LDM Meta data in SP RAID superblock.

One or more LDMs can be present on a single node. If nodes have more than one LDM, then physical disks can be grouped based on disk characteristics. In some embodiments, a single LDM can manage up to 132 disks, for example, two DS60 disks and one shelf of cache disks.

The LDM can manage allocation and ownership of PEs. As arrays are created through the creation process, the physical extent manager can request allocation from all LDMs that own PEs across a cluster. The LDM can allocate the PEs that the LDM owns, and store the current owner (e.g., an array group UUID and/or array UUID) of each PE in the LDM's superblock data. When a node is booted, the node's LDM can provide the current state for all PEs to upper level processes.

When one or more physical disks are added to an LDM, the LDM can assign a performance group to each physical disk. The PEM can allocate disk resources to arrays based on the performance group of each physical disk, thus allowing for different arrays to have different performance tiers.

The LDM can monitor error counters of a physical disk and notify the PEM if a disk exceeds an error threshold. The PEM can initiate replacement of the failed disk. In some embodiments, if a write error occurs, the array can fail the PE and notify the LDM that the PE has failed. The LDM can fail the disk, notify each array that have PEs allocated on the failing disk, and/or broadcast a message to PEMs on all nodes indicating that a disk has failed. All arrays that failed PEs can run in a degraded state until a replacement PE is issued from the PEM. When the array receives a new PE(s) a reconstruction begins.

In some embodiments, an array group 108 contains a collection of arrays 110 that belong to the same file system. In some embodiments, only one array group belongs to the same collection partition. The array group can perform the creation, reconstruction, reassembling, disassembling, and destruction of a file system and the arrays that are associated with the file system.

In some embodiments, the array group can be created on any node in the cluster and can migrate to any node in the cluster but can only be assembled on one node at a time. The array group can have a unique ID that upper level processes can use to identify and manage the array group and its arrays. For example, if storage node 1 fails, array group 108 can be migrated to storage node 122.

Physical extent allocation can be managed by the PEM 102 which can communicate with all LDMs in a cluster. A PEM can reside on each node in a cluster. During array creation or expansion, the LDM that manages the physical disk can allow allocation of physical extents to arrays (or virtual disks within each array).

In some embodiments, a node 101 includes one or more array groups 108. Each array group includes one or more arrays 110. Each array includes one or more virtual disks 111. Each virtual disk includes one or more PEs which can be addressed across multiple physical disks such as physical disks 107, or physical disks that reside on other nodes. The physical disks on each node are pooled together to form a protection pool.

An LDM can assign each PE with a UUID when the physical disk that the PE resides on is added to an LDM. Universally Unique Identifiers, or UUIDS, can be 128 bit numbers, that are composed of 16 octets and represented as 32 base-16 characters. UUIDs can be used to identify information across a computer system.

The PE UUID can include of four parts that describe the location of the PE. The PE UUID can contain a node UID, LDM UID, disk UID and the PE offset. Each of the UIDs within the PE UUID can be 32 bits and the UUID can be a total of 128 bits. The PE offset can be based on the PE's physical LBA within the disk's physical extent partition.

Logical block addressing (LBA) is a scheme that can be used for specifying the location of blocks of data stored on computer storage devices, such as a hard disk drive (e.g., a physical disk). LBA can be a linear addressing scheme—the disk can be divided into blocks of data that can be located by an integer index—the first block can have index 'LBA 0', the second 'LBA 1', and so on. The LBA scheme can use a 22-bit LBA, a 28-bit LBA, or other LBA size. The size of entries in on-disk and in-memory data structures holding the address can be 32 bits, such as the or 64 bits. Most hard disk drives released after 1996 implement logical block addressing.

In some RAID systems, array space is defined by the size of a disk partition size. As such, when a file system is created or grown, one array is created per disk partition. In some embodiments, a protection pool data layout can divide the disk partition into equal size physical extents. This allows arrays to be a collection of physical extents. When an array of virtual disks is created, one or more physical extents can be assigned to the array, allocated from physical disks on one or many nodes in a cluster. Physical extent size can be configurable at compile time or runtime and can be the same size across all nodes.

Protection pools can allocate file system data within a partition, but a single partition in a physical disk can contain PEs that are allocated to multiple arrays. This allows additional partitions to be created for other uses if needed. As described and shown in FIG. 2, the physical extent partition on a physical disk can be divided into many physical extents, allowing arrays to be created from a group of physical extents.

Figure 3:
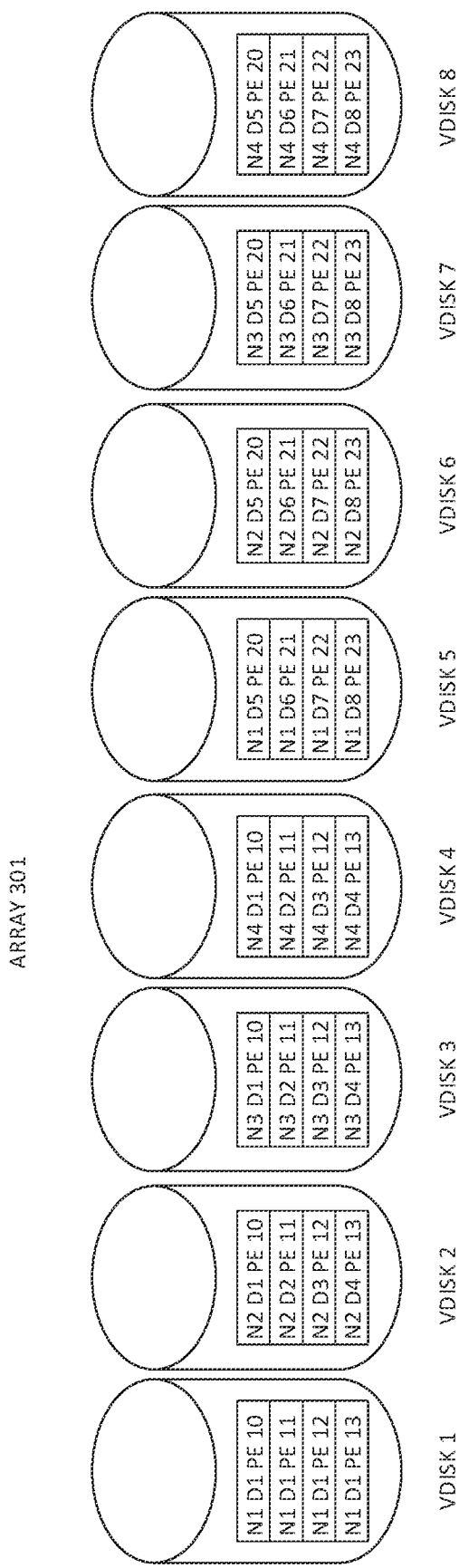
FIG. 3 shows an example of an array with virtual disks, according to some embodiments.

FIG. 3 shows an example of virtual disks in an array 301, according to some embodiments. An array of virtual disks can include one or more virtual disks such as virtual disks 1-8. Each virtual disk can include a list of PEs. Each list can represent one virtual disk, and each list can contain one or more PEs. Array 301 is an example of an array that can be implemented as array 110 in FIG. 1.

The list of PEs of each virtual disk can include a node identifier, a disk identifier that identifies the disk on that node, and physical extent index that identifies the physical extent on that disk. For example, 'N2 D1, PE10' as shown in the list of virtual disk 2 indicates that virtual disk 2 has allocated to it a physical extent at a PE index of PE10 on disk 1 of node 2.

In some embodiments, a virtual disk can include a list of one or more PEs that represents a stripe unit index within an array. Virtual disks objects can be contained in a virtual disk set and each virtual disk represents a stripe unit index in an array. In some embodiments, up to 24 PEs can be assigned to each virtual disk. Each row of PEs in the virtual disk set can serve as a small array with the parent array. Each PE in a row can be allocated from a different physical disk. A PE that is listed in an array can reside on any physical disk or any node. The allocation of PEs on physical disks for an array are managed so that PEs in one PE row in an array are not allocated on the same physical disk. PEs are managed by the PEM and PE ownership is verified and approved by the LDM that owns the physical disk at array creation, array expansion or allocation of a spare PE.

Arrays may be created for different uses and RAID levels. When an array is created, a RAID level can be assigned to the array. Arrays can have different RAID level or different number of PEs.

FIG. 4 shows an example system for data storage with a plurality of nodes, according to some embodiments. Nodes 401, 402, 403, and 404 can form a cluster. Each node can include an array group that has two PPART 6+2 arrays and one EXT3 3-way mirrored array. A PPART is an array that belongs to the collection partition. In this example, each node can have two virtual disks, each virtual disk having one PE. This cluster and PE layout can support two failed physical disks or one failed node. It should be understood that although each virtual disk includes one PE in this example, a virtual disk can support many PEs.

The protection pool driver can use a 128-bit UUID to identify array groups, arrays, LDMs, an LDM physical disk, and physical extents. A UUID layout such as that shown below in Table 1 allows mapping of arrays to array groups, a PE offset to a disk, and/or a LDM to a Node.

TABLE 1

| Type | Bits 95-127 | Bits 64-95 | Bits 32-63 | Bits 0-31 |
| --- | --- | --- | --- | --- |
| Array Group UUID | AGRP Magic Number | 32 bit AGRP UID | Reserved | Reserved |
| Array UUID | AGRP Magic Number | 32 bit AGRP UID | 32 bit Array UID | Reserved |
| LDM UUID | 32 bit Node UID | 32 bit LDM UID | Reserved | Reserved |
| LDM Disk UUID | 32 bit Node UID | 32 bit LDM UID | 32 bit disk UID | Reserved |
| PE UUID | 32 bit Node UID | 32 bit LDM UID | 32 bit disk UID | 32 bit PE Offset |

A 128-bit Array Group UUID can be used to keep all the arrays that make up a collection partition under one umbrella. The array group UUID can include a 32-bit magic number and a 32-bit array group UID. The 'magic number' can be any agreed upon number that identifies the UUID as an array group UUID.

As arrays are created, the array UUID can be created by using the array group UUID as a base and adding a 32-bit array UID. By grouping the arrays under the array group UUID, the array group and all its components (e.g., the arrays and virtual disks therein) can be moved from one node to another node, based on the array group UUID and/or array UUID.

The 128-bit LDM UUID can be used for multiple purposes. The LDM UUID indicates which node owns the LDM, which disks that belong that LDM. Also, it provides the PE location of each PE. When a LDM is created, the LDM UUID is made up of the node UID and the LDM UID. As each disk is added to an LDM, a disk UUID is created for each disk. The disk UUID has the LDM UUID as a base, and then includes an additional disk UID.

A PE UUID can be created with the node UID, the LDM UID, the disk UID, and a PE offset. The PE offset can be determined by using an LBA offset of a PE, and shifting this LBA offset (e.g., right 22 or 23 bits, depending on application). In such a manner, the LDM UUID can serve as a basis to generate a disk UUID. The disk UUID can, in turn, serve as a basis to generate a PE UUID. The PE UUID can be used to access a PE, for example, in response to an I/O request.

Referring to FIG. 1, when processing a I/O request from the file system 124, the array can pass the PE UUID that is being accessed in the I/O disk request to the proper node. For example, an I/O request from the file system can specify an array and byte offset. The array and byte offset in this I/O request can be mapped to a PE in the virtual disk. This PE can be associated with a PE UUID. For example, the array and byte offset can be divided indicate a memory size. This memory size can be divided by a size of PE rows in a virtual disk to determine what row of extents the I/O request is referring to. For example, if each row is 100,000 bytes in size and a request is received for byte offset 650,000 then the I/O request can be calculated as the sixth extent row which starts at byte offset 600,000. The remaining offset of 50,000 can be used to determine the RAID stripe offset within the extent row.

As the I/O request is being processed, the node UID can be used to route the request to the node that corresponds to the node UID. Once received by the node, the LDM UID is used by the protection pool driver to identify which LDM contains the relevant disk. The LDM provides the disk object such as disk object 109 in FIG. 1, and the PE offset can be shifted left (e.g., 22 or 23 bits) to provide the PE starting offset. The offset in the I/O request can then be added to the PE starting offset, to provide the PE offset for data referenced in the I/O request. The LDM can process the I/O request with the PE UUID by accessing the disk using the disk object. The disk object 109 can be a software and hardware driver that allows read and/or write access to a physical disk. The disk object can include information to communicate with the Linux SCSI mid layer and map to the physical disk. An LDM can retrieve a corresponding disk object for a disk that the LDM owns. Once the disk access is complete the results can be returned to the original node.

Figure 5:
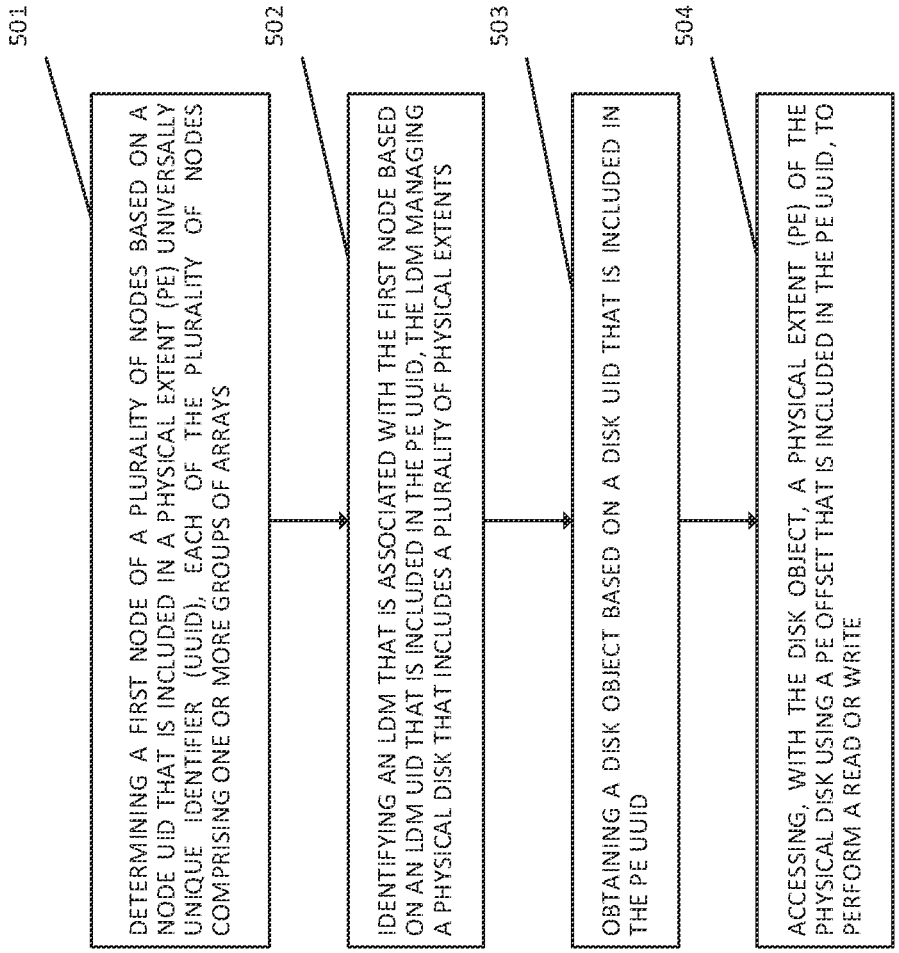
FIG. 5 shows an example of a method for accessing data using a UUID, according to some embodiments.

FIG. 5 shows an example of a method 500 for accessing data, according to some embodiments. The method may be performed by processing logic (e.g., processing logic 131 in FIG. 1) that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. The method illustrates example functions used by various embodiments. Although specific function blocks ("blocks") are disclosed in the method, such blocks are examples. That is, embodiments are well suited to performing various other blocks or variations of the blocks recited in method. It is appreciated that the blocks in method 500 may be performed in an order different than presented, and that not all of the blocks in method 500 may be performed.

At block 501, processing logic determines a first node of a plurality of nodes based on a node unique identifier (UID) that is included in a physical extent (PE) universally unique identifier (UUID), each of the plurality of nodes can include one or more groups of arrays, such as array group 108 in FIG. 1. Each of the groups of arrays can include a collection of arrays that are associated with a common file system. For example, array group 108 can include a group of arrays that store data that makes up a file system 124.

At block 502, processing logic identifies a local disk manager (LDM) that is associated with the first node based on an LDM UID that is included in the PE UUID, the LDM managing a physical disk that includes a plurality of physical extents.

At block 503, processing logic obtains a disk object based on a disk UID that is included in the PE UUID. The disk object can include a driver that includes hardware and software that allows the processing logic to access a disk for read and/or writes.

At block 504, processing logic accesses, with the disk object, a physical extent (PE) of the physical disk using a PE offset that is included in the PE UUID, to perform a read or write. In some embodiments, accessing the PE in the disk object can include left shifting the PE offset and using a result as a logical block address (LBA) of the physical disk. As discussed, the PE offset can be generated by right shifting the LBA offset of the physical disk where the PE is located.

In some embodiments, the method can be performed in response to an I/O request. For example, a user can generate an I/O request (e.g., a read or a write) in user space with respect to a file system. The file system can generate an I/O request with an array and byte offset, which is mapped to the file system. Processing logic can determine the PE UUID based on mapping the array and byte offset to the plurality of nodes, an array within one of the nodes, and/or a row and stripe location of a PE within the array. From this mapping, the PE UUID can be generated to include the node UID, the LDM UID, the disk UID, and the PE offset. Once the physical extent UUID is known it is used to direct the I/O to the disk containing the physical extent.

In some embodiments, processing logic can move at least one of the one or more groups of arrays from the first node to a second node of the plurality of nodes. As discussed with relation to Table 1, an array UUID can be used to group arrays together, to migrate an array group from one node to another within a cluster. One or more groups of arrays can be moved from one array to another, based on an array UUID that includes an array group UUID that is uniquely associated with each of the one or more groups of arrays that is used to support a file system, and an array UID that uniquely identifies each array in each of the one or more groups of arrays. In some embodiments, the one or more groups of arrays are moved from the first node to the second node in response to a failure of the first node. System reliability can thus be improved.

Figure 6:
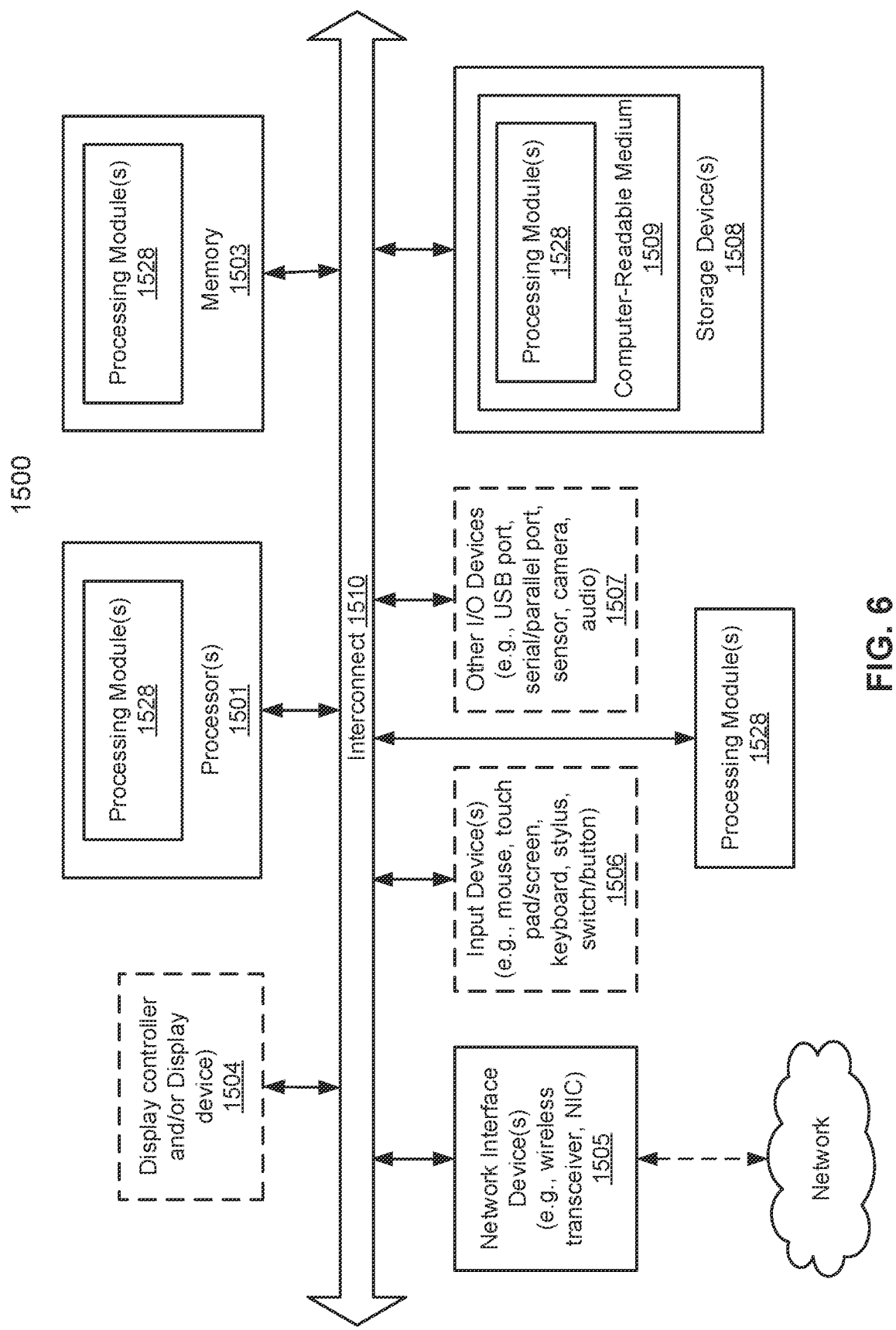
FIG. 6 shows an example data processing system, according to some embodiments.

FIG. 6 shows an example data processing system, according to some embodiments. This example data processing system, which can be described as a computing system, may be used in conjunction with one or more embodiments of the disclosure, such as for performing the method described in FIG. 5 and/or as a storage node described throughout the disclosure.

For example, system 1500 may represent any of data processing systems on which a storage node can reside, that can perform any of the processes or methods described above. System 1500 can include many different components. In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501 may be configured to execute instructions for performing the methods, processes, operations, functions, etc. as discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include various electronic displays (e.g., a monitor having a screen, a small LCD touch-screen or any other electrical device that is operable to display information), audio output (such as speakers). An audio device may include a speaker and/or a microphone to facilitate voice-enabled functions, such as voice recognition, voice replication, digital recording, and/or tele phony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

Storage device 1508 may include computer-readable storage medium 1509 (or machine-readable storage medium, computer-accessible medium, etc.) on which is stored one or more sets of instructions or software (e.g. processing modules 1528) embodying any one or more of the methods, processes, operations, functions, etc. as described herein. In addition, the computer-readable storage medium 1509 may also include removable or portable media (e.g. magnetic disk storage media, optical storage media, USB media, CD-ROM, flash memory devices, etc.).

Processing modules 1528 (or component/unit/logic) may represent any of the components of the data manager, host, cloud provider, etc., such as, for example, backup application 302. Processing modules 1528 may also reside, completely or at least partially, within memory 1503 and/or within processor 1501 during execution thereof by system 1500, memory 1503, and processor 1501, which may also constitute a computer-readable storage medium. In addition, processing modules 1528 can be implemented as firmware or functional circuitry within hardware devices. Further, processing modules 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

The processes or methods depicted in the preceding figures may be performed by processing logic that comprises hardware (e.g. circuitry, dedicated logic, etc.), firmware, software (e.g., embodied on a non-transitory computer-readable storage media), or a combination of both. Although the processes or methods are described above in terms of some sequential operations, it should be appreciated that some of the operations described may be performed in a different order. Moreover, some operations may be performed in parallel rather than sequentially.

The term "approximately" or "substantially" may be used herein and may be interpreted as "as nearly as practicable," "within technical limitations," and the like. In addition, the use of the term "or" indicates an inclusive "or" (e.g. "and/or") unless otherwise specified.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method, comprising:
   determining a first node of a plurality of nodes based on a node unique identifier UID that is included in a physical extent (PE) universally unique identifier (UUID), each of the plurality of nodes comprising one or more groups of arrays;
   identifying a local disk manager (LDM) that is associated with the first node based on an LDM UID that is included in the PE UUID, the LDM managing a physical disk that includes a plurality of physical extents;
   obtaining a disk object based on a disk UID that is included in the PE UUID; and
   accessing, with the disk object, a physical extent (PE) of the physical disk using a PE offset that is included in the PE UUID, to perform a read or write.

2. The method of claim 1, wherein an I/O request is received from a file system that is mapped to the plurality of nodes, and wherein the PE UUID is determined by mapping an array and byte offset in the I/O request to a row and stripe location of the PE.

3. The method of claim 1, wherein each of the one or more groups of arrays include a collection of arrays that are associated with a common file system.

4. The method of claim 1, further comprising moving at least one of the one or more groups of arrays from the first node to a second node of the plurality of nodes, based on an array UUID that includes
   an array group UUID that is uniquely associated with each of the one or more groups of arrays that is used to support a file system, and
   an array UID that uniquely identifies each array in each of the one or more groups of arrays.

5. The method of claim 4, wherein the at least one of the one or more groups of arrays are moved from the first node to the second node in response to a failure of the first node.

6. The method of claim 1, wherein a portion of the physical disk is accessed by left shifting the PE offset and using a result as a logical block address to access the PE on the physical disk.

7. The method of claim 1, wherein the PE UUID is a 128-bit field, and the node UID, the LDM UID, the disk UID, and the PE offset are each 32 bits in the PE UUID.

8. The method of claim 1, wherein each of the one or more groups of arrays comprise one or more virtual disks, and each of the one or more virtual disks comprises a list of physical extents (PEs) that are mapped to one ore more physical disks.

9. A non-transitory computer-readable medium storing instructions which, when executed by one or more processors of a networked computing device, cause the computing device to perform operations comprising:
   determining a first node of a plurality of nodes based on a node unique identifier (UID) that is included in a physical extent (PE) universally unique identifier (UUID), each of the plurality of nodes comprising one or more groups of arrays;
   identifying a local disk manager (LDM) that is associated with the first node based on an LDM UID that is included in the PE UUID, the LDM managing a physical disk that includes a plurality of physical extents;
   obtaining a disk object based on a disk UID that is included in the PE UUID; and
   accessing, with the disk object, a physical extent (PE) of the physical disk using a PE offset that is included in the PE UUID, to perform a read or write.

10. The non-transitory computer-readable medium of claim 9, wherein an I/O request is received from a file system that is mapped to the plurality of nodes, and wherein the PE UUID is determined by mapping an array and byte offset in the I/O request to a row and stripe location of the PE.

11. The non-transitory computer-readable medium of claim 9, wherein each of the one or more groups of arrays contain a collection of arrays that are associated with a common file system.

12. The non-transitory computer-readable medium of claim 9, further comprising moving at least one of the one or more groups of arrays from the first node to a second node of the plurality of nodes, based on an array UUID that includes an array group UUID that is uniquely associated with each of the one or more groups of arrays that is used to support a file system, and an array UID that uniquely identifies each array in each of the one or more groups of arrays.

13. The non-transitory computer-readable medium of claim 12, wherein the at least one of the one or more groups of arrays are moved from the first node to the second node in response to a failure of the first node.

14. The non-transitory computer-readable medium of claim 9, wherein a portion of the physical disk is accessed by left shifting the PE offset and using a result as a logical block address to access the PE on the physical disk.

15. A data processing system, comprising:
   computer-readable memory; and
   one or more processors that executes instructions stored on the computer-readable memory, causing the data processing system to perform operations including:
   determining a first node of a plurality of nodes based on a node unique identifier (UID) that is included in a physical extent (PE) universally unique identifier (UUID), each of the plurality of nodes comprising one or more groups of arrays;
   identifying a local disk manager (LDM) that is associated with the first node based on an LDM UID that is included in the PE UUID, the LDM managing a physical disk that includes a plurality of physical extents;
   obtaining a disk object based on a disk UID that is included in the PE UUID; and
   accessing, with the disk object, a physical extent (PE) of the physical disk using a PE offset that is included in the PE UUID, to perform a read or write.

16. The data processing system of claim 15, wherein an I/O request is received from a file system that is mapped to the plurality of nodes, and wherein the PE UUID is determined by mapping an array and byte offset in the I/O request to a row and stripe location of the PE.

17. The data processing system of claim 15, wherein each of the one or more groups of arrays includes a collection of arrays that are associated with a common file system.

18. The data processing system of claim 15, further comprising moving at least one of the one or more groups of arrays from the first node to a second node of the plurality of nodes, based on an array UUID that includes an array group UUID that is uniquely associated with each of the one or more groups of arrays that is used to support a file system, and an array UID that uniquely identifies each array in each of the one or more groups of arrays.

19. The data processing system of claim 18, wherein the at least one of the one or more groups of arrays are moved from the first node to the second node in response to a failure of the first node.

20. The data processing system of claim 15, wherein a portion of the physical disk is accessed by left shifting the PE offset and using a result as a logical block address to access the PE on the physical disk.

\* \* \* \* \*